United States Patent
Laroia et al.

(10) Patent No.: US 7,941,173 B2
(45) Date of Patent: *May 10, 2011

(54) BEACON SIGNALS FACILITATING SIGNAL DETECTION AND TIMING SYNCHRONIZATION

(75) Inventors: Rajiv Laroia, Basking Ridge, NJ (US); Vladimir Parizhsky, New York, NY (US); Junyi Li, Bedminster, NJ (US); Sathyadev Venkata Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1608 days.

This patent is subject to a terminal disclaimer.

(21) Appl. No.: 11/251,103

(22) Filed: Oct. 14, 2005

(65) Prior Publication Data

US 2006/0083267 A1 Apr. 20, 2006

Related U.S. Application Data

(60) Continuation-in-part of application No. 11/153,767, filed on Jun. 14, 2005, now Pat. No. 7,859,986, which is a division of application No. 10/964,965, filed on Oct. 14, 2004, now Pat. No. 7,092,353.

(60) Provisional application No. 60/512,468, filed on Oct. 17, 2003, provisional application No. 60/618,720, filed on Oct. 14, 2004.

(51) Int. Cl.
*H04B 7/00* (2006.01)
*H04Q 7/20* (2006.01)

(52) U.S. Cl. ........ 455/522; 455/502; 455/69; 455/67.11

(58) Field of Classification Search .......... 455/434, 455/515, 452.2, 435.2, 422.1, 561, 563, 446, 455/502, 67.11, 69, 115.1, 522, 452.1, 126, 455/127.1; 370/503, 210, 330, 345; 375/260, 375/355, 357

See application file for complete search history.

(56) References Cited

U.S. PATENT DOCUMENTS

| 6,389,087 | B1 | 5/2002 | Heinonen et al. | |
|---|---|---|---|---|
| 6,912,262 | B1 * | 6/2005 | Chini et al. | 375/365 |
| 7,092,353 | B2 * | 8/2006 | Laroia et al. | 370/210 |
| 7,280,829 | B2 * | 10/2007 | Rudolf | 455/434 |
| 7,385,953 | B2 * | 6/2008 | Ho et al. | 370/330 |
| 2002/0126706 | A1 | 9/2002 | Laroia et al. | |

FOREIGN PATENT DOCUMENTS

CN 1293501 5/2001

(Continued)

OTHER PUBLICATIONS

International Search Report for PCT International Application PCT/US2005/037019 dated Oct. 23, 2007 pp. 1-2.

(Continued)

*Primary Examiner* — John Lee
(74) *Attorney, Agent, or Firm* — Michelle Gallardo; Sam Talpalatsky; Jonathan T. Velasco

(57) ABSTRACT

Improved beacon signaling methods are described. Beacon signals are transmitted on the same tone in at least two consecutive symbol periods facilitating accurate energy measurements over a symbol period even if timing synchronization with the transmitter is not maintained. A low power wideband signal is also combined with the beacon signal to facilitate channel estimation and other operations such as timing synchronization operations.

57 Claims, 9 Drawing Sheets

FOREIGN PATENT DOCUMENTS

| | | |
|---|---|---|
| CN | 1329805 | 1/2002 |
| JP | 10-210002 | 11/1980 |
| JP | 2002-223479 | 8/2002 |
| JP | 2004214746 A | 7/2004 |
| WO | WO9916261 | 4/1999 |

OTHER PUBLICATIONS

Written Opinion of the International Searching Authority, PCT International Application PCT/US2005/037019 dated Oct. 23, 2007 pp. 1-6.

* cited by examiner

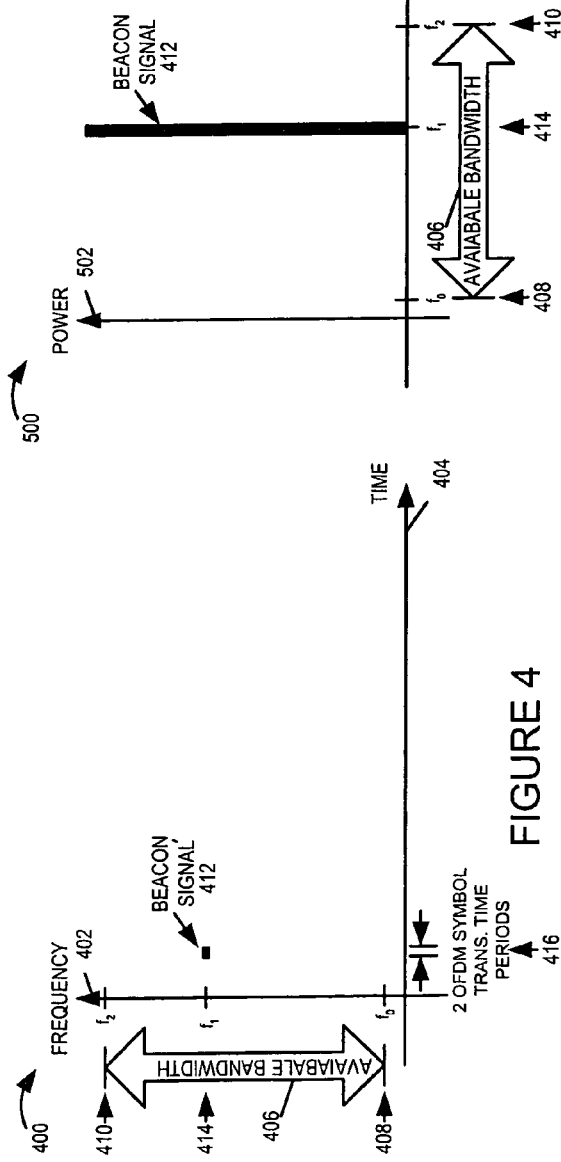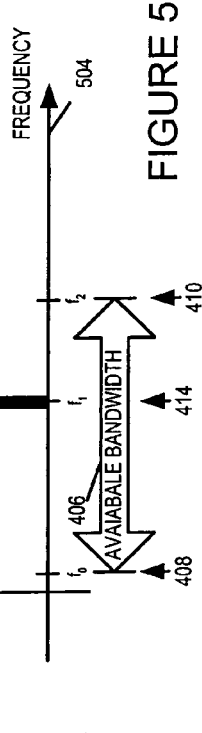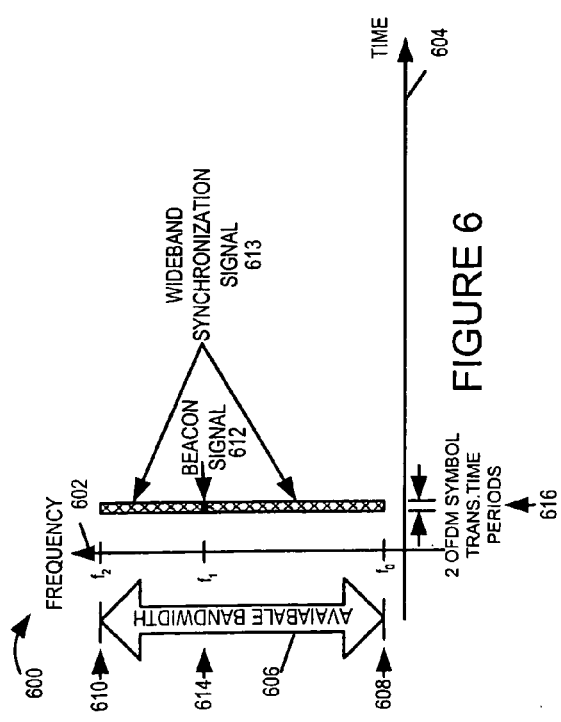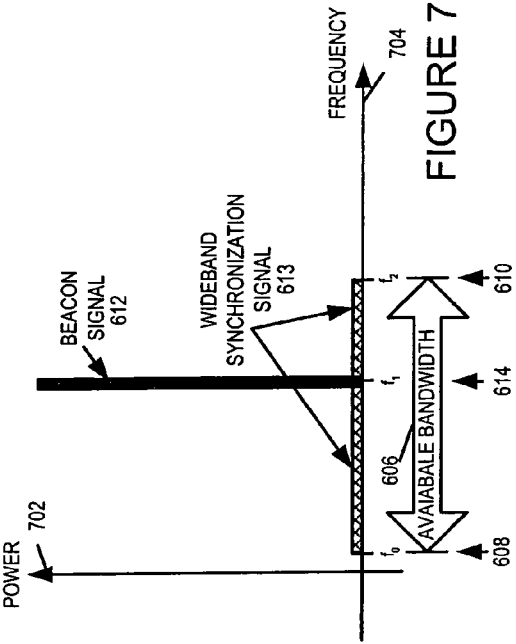

BEACON SIGNALS FACILITATING SIGNAL DETECTION AND TIMING SYNCHRONIZATION

RELATED APPLICATIONS

The present application is a continuation in part of co-pending U.S. patent application Ser. No. 11/153,767, filed Jun. 14, 2005 now U.S. Pat. No. 7,859,986 which is a divisional of U.S. patent application Ser. No. 10/964,965, filed Oct. 14, 2004 which issued as U.S. Pat. No. 7,092,353 and which claims the benefit of U.S. Provisional Patent Application Ser. No. 60/512,468 filed Oct. 17, 2003, and this application claims the benefit of U.S. Provisional Patent Application Ser. No. 60/618,720, filed on Oct. 14, 2004, titled "IMPROVED BEACON SIGNALS FACILITATING SIGNAL DETECTION AND TIMING SYNCHRONIZATION", said U.S. Provisional Patent Application Ser. No. 60/618,720 being hereby expressly incorporated by reference but none of the other patent applications mentioned above being incorporated by reference.

FIELD OF THE INVENTION

The present invention relates to methods and apparatus for providing signals suitable for identifying transmitter and/or making timing or other adjustments relative to a transmitter and, more particularly, to methods and apparatus for generating and using improved beacon signals.

BACKGROUND

Narrow high powered signals may be transmitted periodically from a base station transmitter to allow a mobile device to identify a nearby transmitter and make various signal measurements. The signal measurements may be used to determine the relative strength of signals received from different transmitters and/or to make mobile adjustments, e.g., timing adjustments to facilitate communication with a base station from which a beacon signal is received.

In some systems beacon signals are transmitted periodically by each transmitter in a system. Normally neighboring transmitters transmit beacon signals at different times. In most cases wireless terminal receiving a beacon can identify the transmitter, e.g., base station or sector of a base station, from the frequency, time and/or other beacon signal related information. In some known systems beacon signals are transmitted using a single tone during a single symbol transmission period with data being transmitted by the transmitter in the following symbol period.

The narrowband nature of such beacon signals makes them difficult to use for timing synchronization. To facilitate timing synchronization, wideband signals from the transmitter would be preferable.

Given that beacon signals tend to be very high power signals they are relatively easy to detect even if the receiver is not fully synchronized, in terms of symbol timing, with the transmitter. Unfortunately, if timing synchronization with the transmitting station is not accurate, the full energy of a beacon signal may not be detected within a single symbol period. This makes measuring the energy of beacons from different base station transmitters with which timing synchronization may not exist difficult. In order to a mobile to make accurate signal strength estimates, it is important that accurate energy estimation be possible.

In view of the above discussion, it should be appreciated that there is a need for improved beacon signal transmission methods. It would be desirable if improved beacon signaling and/or methods of transmitting and/or using beacon signals were available which would facilitate both accurate energy detection and/or facilitate timing synchronization with the transmitting device, e.g., base station or base station sector transmitter.

BRIEF DESCRIPTION OF THE FIGURES

FIGS. 4 and 5 illustrate an exemplary OFDM beacon signal, in accordance with the present invention.

FIGS. 6 and 7 illustrate an exemplary OFDM beacon signal/wideband synchronization signal combination in accordance with the present invention.

SUMMARY OF THE INVENTION

Figure 1:
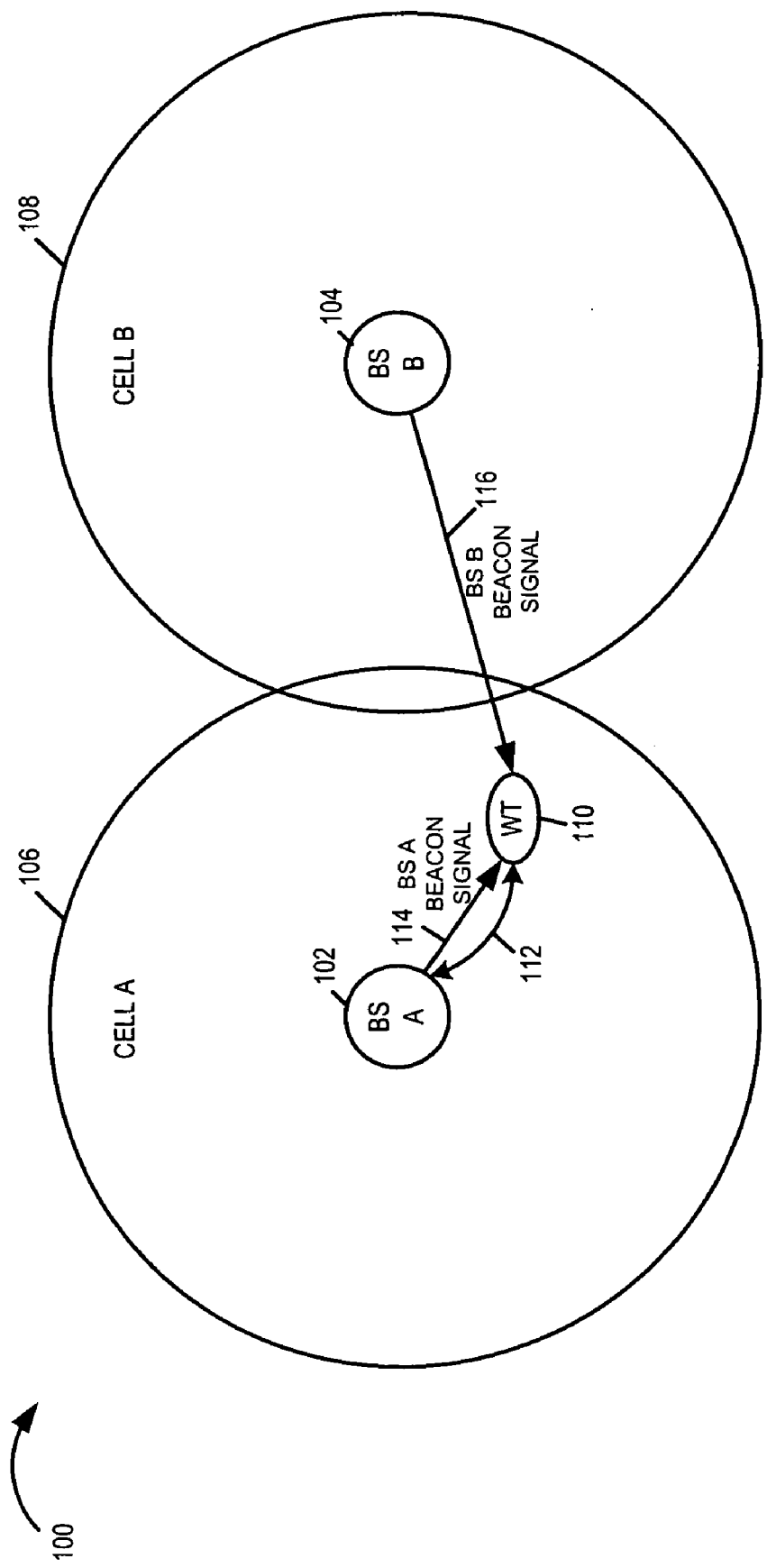
FIG. 1 is a drawing of an exemplary wireless communications system implemented in accordance with the present invention.

The present invention is directed to methods and apparatus for generating, transmitting and/or using improved narrowband beacon signals. In accordance with the invention a narrowband beacon signal is transmitted over a period of time corresponding to multiple symbol transmission time periods, e.g., two or more OFDM symbol transmission time periods. A beacon signal of the present invention will occupy the same tone for multiple consecutive symbol transmission time periods. Beacon signals transmitted in accordance with the present invention are transmitted at a high power level. The beacon signals may be transmitted at a per tone transmission power level that is 3 db, 6 db or more above the average per tone transmission power level used to transmit user data. In some embodiments the transmitter energy placed on the beacon signal includes 60% or more of the total transmitter transmission power during a time period in which the beacon signal is transmitted. However, this is not mandatory and may not occur in some implementations.

In addition to a beacon signal, a wideband signal, e.g., synchronization signal, may be transmitted in conjunction with a beacon signal. Tones in the wideband synchronization signal will remain the same for multiple symbol transmission time periods as do the tones dedicated to a beacon signal transmitted with the wideband signal.

Wideband signal transmission with a beacon signal is optional and may not occur in all cases where a beacon signal is transmitted.

Tones allocated to the wideband signal will normally be less than 50% of the tones used by the transmitter. A relatively large number of tones are often used as NULL tones when a beacon signal is transmitted. This allows the power that would otherwise have been placed on these tones to be allocated to the beacon signal while also providing tones which can be used by a receiver in determining signal interference levels since the NULL tones are predictable and can be used by a receiver for interference measurements.

A receiver can use the wideband signal for implementing timing adjustments. It can also use the wideband signal and measurements of the NULL tones to form a channel estimate that can be used when communicating with the base station which transmitted the received beacon signal.

The beacon signal of the present invention having a duration of multiple symbol transmission times facilitates the use of energy detection techniques since the energy of the signal will be present for more than a single symbol transmission time period. Thus, a receiver which is not perfectly synchronized with the transmitter should be able to measure received signal energy for a period of time in which a beacon signal is received, e.g., a symbol transmission time period, without having to be perfectly synchronized with the transmitter of the beacon signal.

Numerous additional features, benefits and embodiments of the invention are discussed and described in the detailed description which follows.

DETAILED DESCRIPTION OF THE INVENTION

FIG. 1 is a drawing of an exemplary wireless communications system 100 implemented in accordance with the present invention, the exemplary system 100 including two adjacent base stations, base station A (BS A) 102 and base station B (BS B) 104. Cell A 106 represents the wireless coverage area of BS A 102, while cell B 108 represents the wireless coverage area of BS B 104. Wireless terminals (WTs), e.g., mobile nodes, may move through the cells of the system, and may communicate with peer nodes, e.g., other WTs through the base stations. Exemplary WT 110, implemented in accordance with the present invention, shown in FIG. 1 is currently using BS A 102 as its point of network attachment and communicates with BS A 102 through wireless communication link 112. Each base station, (BS A 102, BS B 104), transmits, e.g., periodically, a beacon signal, e.g., a relatively short duration high power OFDM signal with the base station transmission power concentrated primarily on one or a few tones. Base station A 102 transmits beacon signal 114, while base station B 104 transmits beacon signal 116. The beacons for different base stations are normally transmitted at different times. The WTs, e.g. WT 110, monitors for and process the beacon signals from multiple, e.g., adjacent BSs.

In FIG. 1, the exemplary WT's 110 point of attachment is BS A 102, and the WT 110 is communicating, e.g., as an active user receiving downlink traffic channel data/information and transmitting uplink traffic channel data/information, through BS A 102. The WT 110 is time synchronized with respect to the timing cycle, e.g., OFDM symbol timing and repetitive timing structure upon which BS A 102 is operating. The WT 110 may or may not be synchronized with respect to the BS B 104 timing. In general, the BS A 102 and BS B 104 timing cycles are not synchronized, and the WT 110 in cell A 106, using BS A 102 as its current point of network attachment, will not be time aligned with respect to base station B 104.

Figure 2:
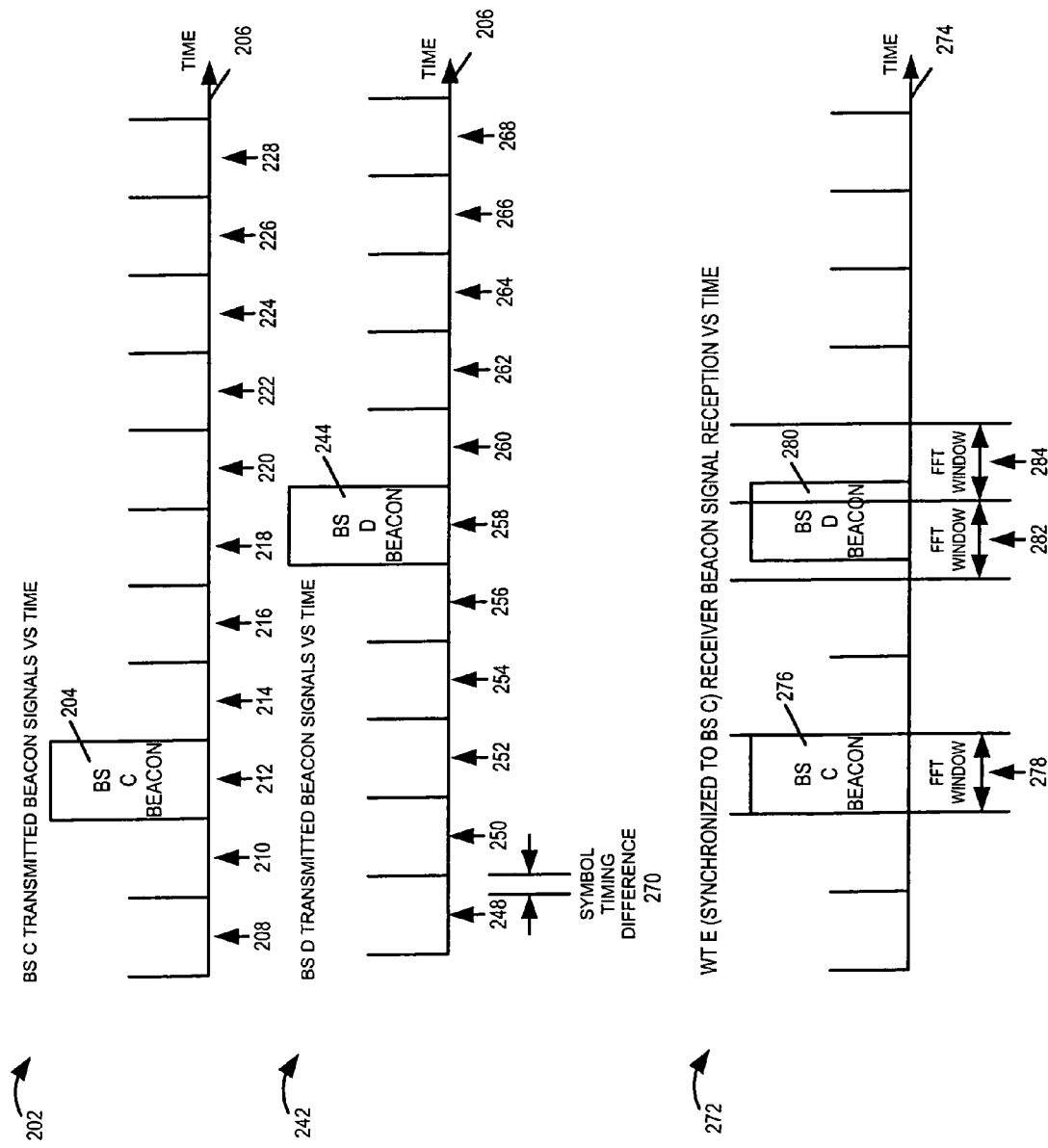
FIG. 2 shows an example where timing for base station C and base station D are offset by an amount which is less than one symbol time period, where each beacon signal occupies one OFDM symbol time period, and where the wireless terminal E receiver has been synchronized with respect to base station C.

FIG. 2 shows an example where timing for BS C and BS D are offset by an amount which is less than one symbol time period, where each beacon signal occupies one OFDM symbol time period, and where the WT E receiver has been synchronized with respect to BS C. A symbol time period is the time used in the system to transmit a modulation symbol. Multiple modulation symbols may be transmitted in parallel using different tones during a single symbol time period, the combination of modulation symbols transmitted in a single OFDM symbol transmission time period is sometimes referred to as an OFDM symbol. The single symbol time period is sometimes called a symbol period or a symbol transmission time period or an OFDM symbol transmission time period. The first drawing 202 shows an exemplary BS C transmitted beacon signal 204 with respect to time 206, where each shown slot (208, 210, 212, 214, 216, 218, 220, 222, 224, 226, 228) represents one OFDM symbol transmission time period. The second drawing 242 shows an exemplary BS D transmitted beacon signal 244 with respect to time 206, where each shown slot (248, 250, 252, 254, 256, 258, 260, 262, 264, 266, 268) represents one OFDM symbol transmission time period. Note that there is a symbol timing difference 270, e.g., an offset, between each BS C OFDM symbol timing slot and each BS D OFDM symbol timing slot. The third drawing 272 shows the WT E receiver beacon signal reception vs time 274. An FFT is used in a receiver to recover the symbols transmitted on different tones during each symbol time. The WT E, as shown, has been synchronized with respect to the BS C; therefore the BS C beacon signal 276 is captured in its entirety within one FFT window 278 of the receiver. However, the BS D beacon signal 280, being out of sync with respect to the WT E receiver, is captured in portions over two successive FFT windows (282, 284) of the receiver. The processing involved to reconstruct beacon signal D from the component FFT pieces and to obtain an accurate representation of beacon signal D can be a complex operation. The received energy of a beacon is used, e.g., to determine which BS has the stronger received signal.

In accordance with the invention, an OFDM beacon signal is generated and used which has a duration of at least 2 OFDM symbol transmission time periods. This approach simplifies the detection operation by the WT receiver, e.g., WT 110 receiver. The WT's receiver FFT window timing need not be synchronized to a base station. During at least one FFT window, the receiver should capture a clean symbol of the beacon signal. During that at least one FFT window, the receiver should observe a peak at the frequency of the beacon signal. The WT 110 can measure the energy content of the beacon signal during that window, and obtain an accurate representation of the received beacon signal energy in one symbol period. Beacon energy for one symbol period can thus be compared in a reliable fashion.

Figure 3:
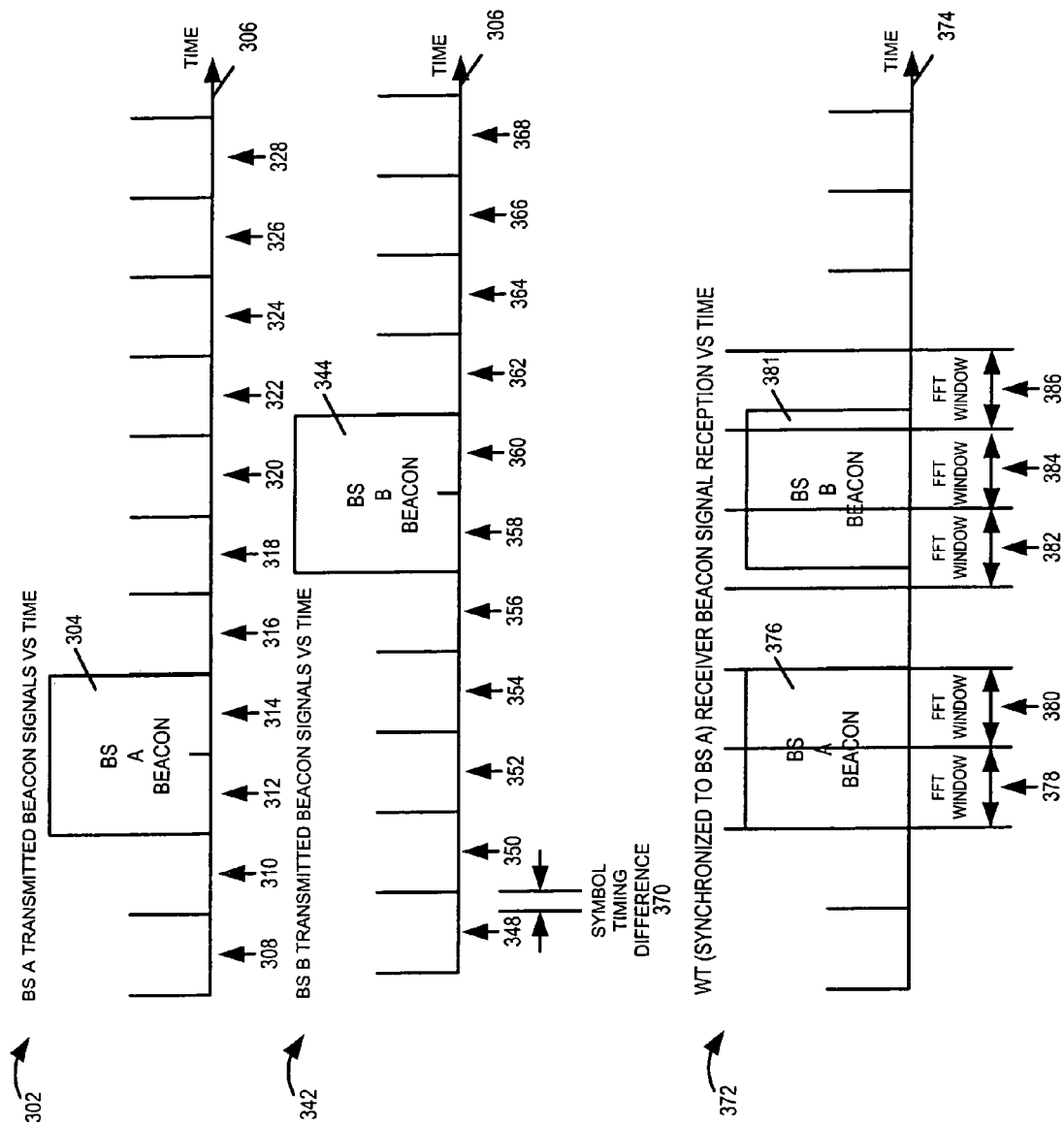
FIG. 3 shows an example, in accordance with the present invention, where timing for base station A and base station B are offset, where each beacon signal occupies two OFDM symbol time periods, and where an exemplary wireless terminal receiver has been synchronized with respect to base station A.

FIG. 3 shows an example where timing for BS A 102 and BS B 104 are offset, where each beacon signal occupies two OFDM symbol time, and where the WT 110 receiver has been synchronized with respect to BS A 102. The first drawing 302 shows an exemplary BS A transmitted beacon signal 304 with respect to time 306, where each shown slot (308, 310, 312, 314, 316, 318, 320, 322, 324, 326, 328) represents one OFDM symbol transmission time period. The second drawing 342 shows an exemplary BS B transmitted beacon signal 344 with respect to time 306, where each shown slot (348, 350, 352, 354, 356, 358, 360, 362, 364, 366, 368) represents one OFDM symbol transmission time period. Note that there is a symbol timing difference 370, e.g., an offset, between each BS A OFDM symbol timing slot and each BS B OFDM symbol timing slot. The third drawing 372 shows the WT receiver beacon signal reception vs time 374. The WT 110, as shown, has been synchronized with respect to the BS A 102; therefore the BS A beacon signal 376 is captured in its entirety within two FFT windows (378, 380) of the receiver. However, the BS B beacon signal 381, being out of sync with respect to the WT receiver, is captured in portions over three successive FFT windows (382, 384, 386) of the receiver. In accordance with the invention, the WT's receiver detects that the energy content of beacon signal B peaks during the second of those three successive OFDM FFT windows, and therefore recognizes that the measured energy during the second FFT window 384 is an accurate representation of received beacon signal B 381.

FIGS. 4 and 5 illustrate an exemplary OFDM beacon signal, in accordance with the present invention. FIG. 4 is a drawing 400 of frequency on the vertical axis 402 vs time on the horizontal axis 404. The available bandwidth 406, e.g., for the exemplary communications band, covers the range from frequency $f_0$ 408 to frequency $f_2$ 410. For example, available bandwidth 406 may correspond to a downlink tone block being used by the base station, e.g., a tone block of 113 evenly spaced contiguous tones. The exemplary beacon signal 412, e.g., a single tone, is at frequency $f_1$ 414, and has a duration of 2 OFDM symbol transmission time periods 416. FIG. 5 is a drawing 500 of power on vertical axis 502 vs frequency on horizontal axis 504 during the time that the beacon signal 412 is transmitted. The transmitter transmission power is concentrated on the beacon signal 412 at frequency $f_1$ 414. With the beacon signal 412 of FIGS. 4 and 5, the beacon signal 414 can be easily detected by the WT receiver, e.g., WT 110 receiver, and identified. When the WT detects and identifies the beacon signal, associating it with a base station, e.g., BS A 102 or BS B 104, the WT can figure out and know the approximate access time, e.g., for establishing communications with that base station. However, it would be beneficial if the WT could get more accurate timing information to synchronize and communicate with the base station than is available simply from the beacon. The beacon signal having a very small bandwidth is not as good a candidate from which to obtain accurate timing information as is a signal with a wide bandwidth. In accordance with a feature of some embodiments of the invention, the BS transmits in conjunction with the narrow band high power beacon signal, a wideband low power synchronization signal, which the WT may use to synchronize with the BS. The wideband signal in some embodiments has a bandwidth at least 5 times wider than the beacon signal. In some embodiments, the wideband signal includes at least 10 times, and in other embodiments at least 20 times the bandwidth of the beacon signal. For example, while the beacon signal is of one frequency tone, the wideband synchronization signal can have at least 10 or 20 tones. Those tones are not necessarily contiguous in frequency. Indeed, they may spread over a wide frequency range and leave some tones in-between not transmitted. The wideband synchronization signal is transmitted in the same time interval as the beacon signal. For example, if the beacon signal is transmitted in 2 OFDM symbol periods, then the wideband synchronization signal is transmitted in the same 2 OFDM symbol periods. While many times wider in terms of frequency than the beacon, the total transmitted power of the wideband signal, excluding the beacon, is less than half the power of the beacon signal. For example, less than 40% total transmitted power may be assigned to the wideband signal with the beacon signal receiving at least 60% power.

FIGS. 6 and 7 illustrate an exemplary OFDM beacon signal 612/wideband synchronization signal 613 combination in accordance with the present invention. FIG. 6 is a drawing 600 of frequency on vertical axis 602 vs time on horizontal axis 604. The available bandwidth 614, e.g., for the exemplary communications band, covers the range from frequency $f_0$ 608 to frequency $f_2$ 610. The exemplary beacon signal 612, e.g., a single tone, is at frequency $f_1$ 614, and has a duration of 2 OFDM symbol transmission time periods 616. The exemplary wideband synchronization signal 613 may occupy a significant portion of the frequency band from $f_0$ 608 to $f_2$ 610 exclusive of the beacon signal tone or tones. Preferably, the exemplary wideband synchronization signal 613 is a multi-tone signal including multiple tones transmitted simultaneously. The number of tones is at least 10 or 20. In some case, the number of tones can be between 50 and 60, e.g., 56. The number is preferably close to the half of the total number of tones. Note that those tones in the exemplary wideband synchronization signal are not necessarily contiguous. For example, suppose that all the available tones are indexed as 0, 1, 2, . . . , N–1, where N is the total number of tones. For example, N=113. Each tone corresponds to a tone frequency. Then the exemplary wideband synchronization signal may includes tones 5, 6, 10, 11, 13, 15, 17, 20, 23, 30, 33, 42, 50, 59, 60, 67, 68, 74, 78, 80, 84, 92, 95, and 101, in which case, the signal occupies the bandwidth from tone 5 to tone 101, but in-between many tones, e.g., tone 7, 8, 9, etc., are not transmitted.

FIG. 7 is a drawing 700 of power on vertical axis 702 vs frequency on horizontal axis 704 during the time that the beacon signal 612 and wideband synchronization signal 613 are transmitted. The base station transmitter transmission power is concentrated on the high power beacon signal 612 at frequency f, 614; however, the wideband synchronization signal 613 is transmitted in parallel at a much lower power level. With the broadcast signal of FIGS. 6 and 7, the beacon signal component 612 can be easily detected by the WT receiver, e.g., WT 110 receiver, and identified, while the wideband synchronization signal 613 allows for timing synchronization to be accomplished by the WT so that the WT can communicate with the identified BS at the appropriate access time.

Figure 8:
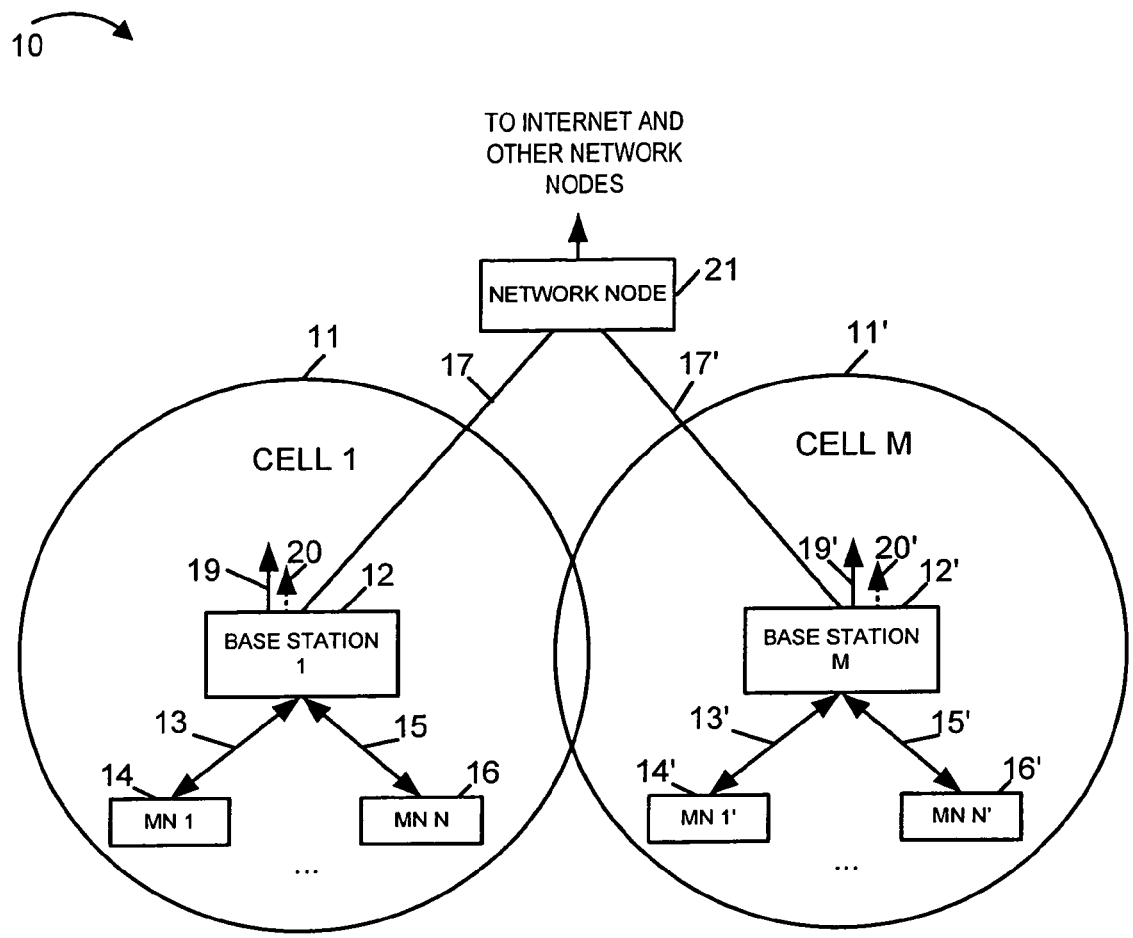
FIG. 8 illustrates an exemplary wireless communications system implemented in accordance with the invention.

FIG. 8 illustrates an exemplary wireless communications system 10 implemented in accordance with the invention. Exemplary wireless communications system 10 is, e.g., an OFDM spread spectrum multiple access wireless communications system. Exemplary system 10 includes a plurality of cells (cell 1 11, cell M 11'). Each cell (cell 1 11, cell M 11') represents the wireless coverage area for a base station (base station 1 12, base station M 12'), respectively. The base stations (12, 12') are coupled to a network node 21 via links (17, 17'), respectively. Network node 21, e.g., a router, is coupled to the Internet and other network nodes. In system 10, multiple mobile wireless terminals, shown as mobile nodes MN 1 (14) through MN N (16) communicate with the base station 12 in cell 1 11 through the use of communication signals 13, 15 via wireless links. Each mobile wireless terminal may correspond to a different mobile user and are therefore sometimes referred to as user terminals. The signals 13, 15 may be, e.g., OFDM signals. The base station 12 and mobile stations 14, 16 each implement the method of the present invention. Thus, signals 13, 15 include signals of the type discussed above, which are transmitted in accordance with the invention. Similarly, in system 10, multiple mobile wireless terminals, shown as mobile nodes MN 1' (14') through MN N' (16') communicate with the base station 12' in cell M 11' through the use of communication signals 13', 15' via wireless links.

Each mobile wireless terminal may correspond to a different mobile user and are therefore sometimes referred to as user terminals. The signals 13', 15' may be, e.g., OFDM signals. The base station 12' and mobile stations 14', 16' each implement the method of the present invention. Thus, signals 13', 15' include signals of the type discussed above, which are transmitted in accordance with the invention.

Each base station (12, 12') transmits beacon signals (19, 19'), in accordance with the invention. Beacon signals 19, 19' may be received and processed by mobile nodes within the transmitting base stations cell and by mobile nodes within other, e.g., adjacent, cells within the system. For example, beacon signal 19 may be received and processed by MNs 14, 16, 14', and 16'. In some embodiments of the invention, wideband synchronization signals (20, 20') are communicated at the same time as the beacon signals (19, 19'). For example, with respect to base station 1 12, in some embodiments, wideband synchronization signal 20 is transmitted in parallel with beacon signal 19. Similarly, with respect to BS M 12', in some embodiments, wideband synchronization signal 20' is transmitted in parallel with beacon signal 19'. These wideband signals (20, 20') like the beacon signals (19, 19') will be detected. The beacon signals (19, 19') are used for power measurements and to identify the base station which is the source of the signal, while the wideband portion of the signal (20, 20') is used by a receiving WT to implement timing adjustments relative to the BS which transmitted the received beacon.

Figure 9:
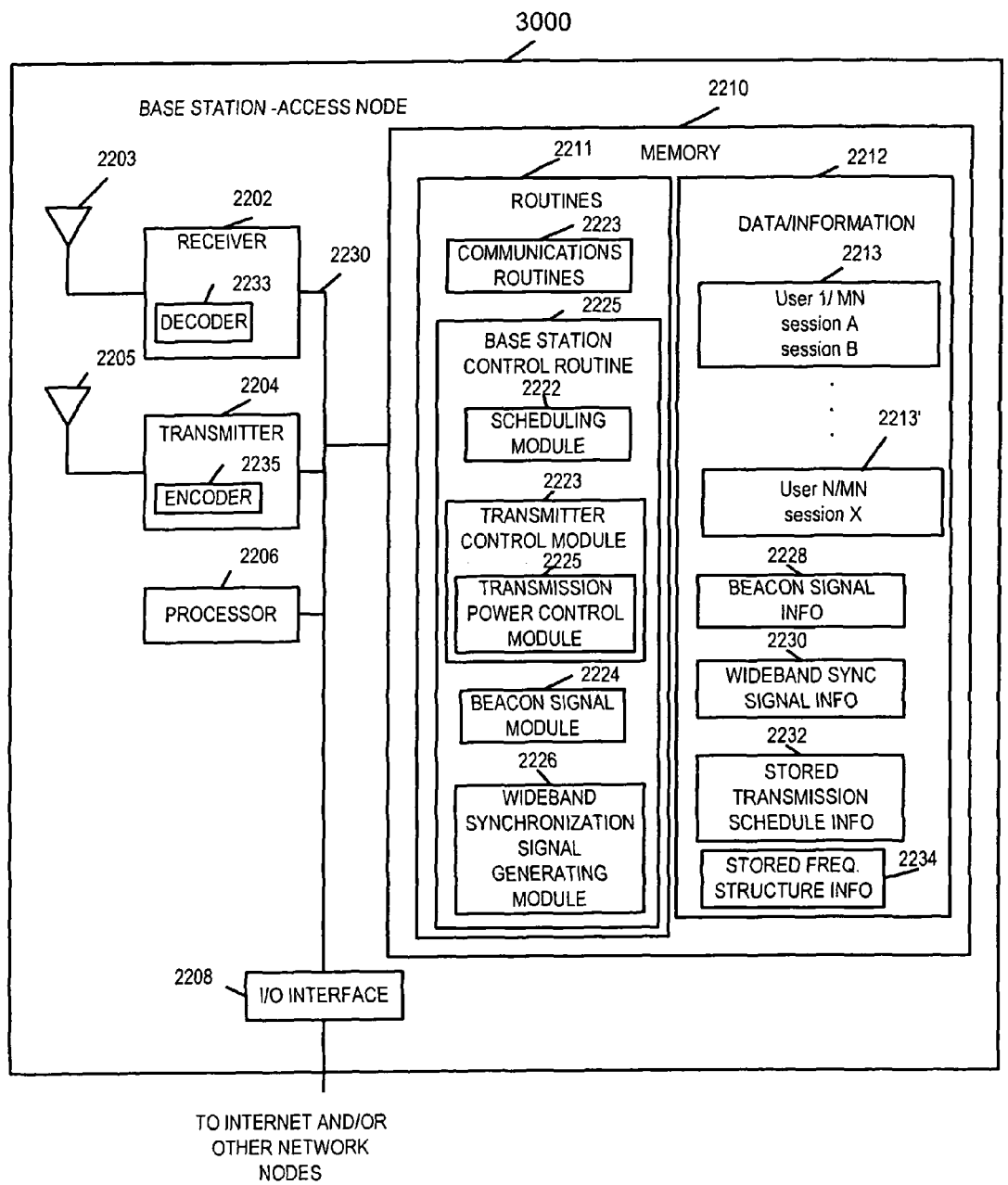
FIG. 9 illustrates an exemplary base station, e.g., an access node (router), implemented in accordance with the invention.

FIG. 9 illustrates an exemplary base station 3000, e.g., an access node (router), implemented in accordance with the invention. Exemplary base station 3000 may be any of the exemplary base stations implemented in accordance with the present invention, e.g., base station A 102 of FIG. 1, base station B 104 of FIG. 1, base station 1 12 of FIG. 8, or base station M 12' of FIG. 8. The base station 3000 includes antennas 2203, 2205 and receiver/transmitter modules 2202, 2204. The receiver module 2202 includes a decoder 2233 for decoding received uplink signals from wireless terminals, while the transmitter module 2204 includes an encoder 2235 for encoding downlink signals to be transmitted to wireless terminals. The modules 2202, 2204 are coupled by a bus 2230 to an I/O interface 2208, processor (e.g., CPU) 2206 and memory 2210. The I/O interface 2208 couples the base station 3000 to the Internet and/or to other network nodes, e.g., other base stations. The memory 2210 includes routine 2221 and data/information 2212. The processor 2206, e.g., a CPU, executes the routines 2211 and uses the data/information 2212 in memory 2210 to control the operation of the base station 3000 and implement methods of the present invention. The memory 2210 includes routines 2211, which when executed by the processor 2206, cause the base station 3000 to operate, e.g., transmit beacon and associated wideband signals, in accordance with the invention. Routines 2211 includes communications routines 2223 used for controlling the base station 3000 to perform various communications operations and implement various communications protocols. The routines 2211 also include a base station control routine 2225 used to control the base station 3000 to implement the steps of the method of the present invention. The base station control routine 2225 includes a scheduling module 2222 used to control transmission scheduling and/or communication resource allocation. Thus, module 2222 may serve as a scheduler, e.g., assigning uplink and downlink channel segments to wireless terminals using the base station 3000 as their current point of network attachment. Base station control routine 2225 also includes a transmitter control module 2223, a beacon signaling module 2224, and a wideband synchronization signal generating module 2226. The transmitter control module 2223 controls the transmitter 2204 to transmit on a recurring basis in accordance with stored transmission schedule information 2232, for two consecutive times OFDM symbol transmission time periods, a narrowband beacon signal, the narrowband beacon signal including at least 60% of the power transmitted by the transmitter 2204 during said two consecutive OFDM symbol transmission time periods. The transmitter control module 2223 includes a transmission power control module 2225. In some embodiments, the transmission power control module 2225 controls the transmitter 2204 to supply at least 80% of the transmitter transmission power, used during the two consecutive symbol time periods in which a beacon signal is transmitted, to the beacon signal. Transmitter control module 2223 also controls the transmission of generated wideband synchronization signals, e.g., in parallel with the narrowband beacon signals. Beacon signal module 2224 generates beacon signals in accordance with the invention, e.g., having a high concentration of power on a single tone and having a duration of at least two OFDM symbol transmission time periods, the same physical tone being used for the beacon for the at least two OFDM symbol transmission time periods. Wideband synchronization signal generating module 2226 generating wideband synchronization signals in accordance with the invention, e.g., using less than 40% of the power transmitted during the time interval of the wideband synchronization signal and using at least 30% of the tones in the downlink tone block being used by the transmitter 2204. In some embodiment, the wideband synchronization signal uses a plurality of physical tones, said plurality of physical tones including the same physical tones during each of two consecutive symbol transmission time periods. In some embodiment, the downlink tone block comprises a set of contiguous evenly spaced tones 113 tones. In some such embodiments, the wideband synchronization signal includes at least 50 of the 113 tones. In some embodiments, the beacon signal and the wideband synchronization signal occupy two consecutive symbol transmission time periods, the same two consecutive symbol transmission time periods.

Memory 2210 also includes data/information 2212 used by communications routines 2223, and control routines 2225. The data/information 2212 includes an entry for each active mobile station user 2213, 2213' which lists the active sessions being conducted by the user and includes information identifying the mobile station (MT) being used by a user to conduct the sessions, and information, e.g., user data related to the session. Data/information 2212 also includes beacon signal information 2228, e.g., tone information, power information, time duration information, e.g., two successive OFDM symbol time periods, time position within a recurring downlink timing structure, etc., associated with beacons to be transmitted by BS 3000. Wideband synchronization signal information 2230, e.g., tone information, power level information, time duration information, time position within a recurring downlink timing structure, e.g., in parallel with the beacon signal, etc., associated with wideband synchronization signals to be transmitted by BS 3000, is also included as part of data/information 2212. Data/information 2212 also includes stored transmission schedule information 2232, e.g., a recurring transmission schedule including information identifying where in the schedule the beacon and wideband synchronization signals should be transmitted, and stored frequency structure information 2234, e.g., information identifying the downlink and uplink carrier frequencies used by the base station, the number of tones in a tone block, e.g., 113, and channel segment structure information in relation to the tones of the tone block.

Servers and/or host devices may be implemented using circuitry which is the same as, or similar to, the circuitry of the exemplary access router shown in FIG. 9 but with interfaces and/or control routines suited to the particular server/host device's requirements. The control routines and/or hardware in such servers and/or hosts cause the devices to implement the above described methods.

Figure 10:
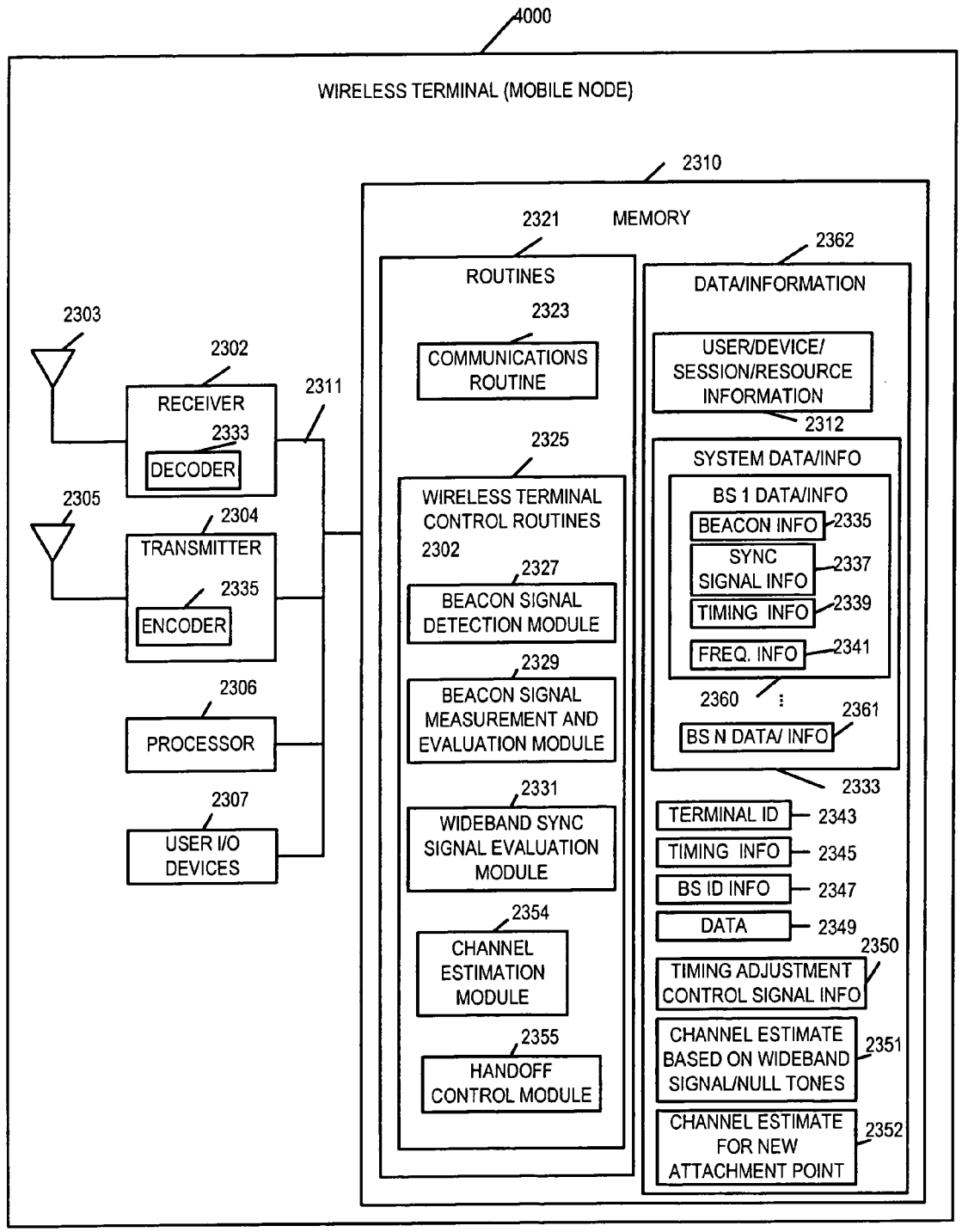
FIG. 10 illustrates an exemplary wireless terminal, e.g., mobile node, implemented in accordance with the present invention.

FIG. 10 illustrates an exemplary wireless terminal 4000, e.g., mobile node, implemented in accordance with the present invention. Exemplary wireless terminal 4000 may be any of the exemplary wireless terminal implemented in accordance with the present invention, e.g., WT 110 of FIG. 1, MN 114, MN N 16, MN 1' 14', or MN N' 16' of FIG. 8. The mobile node 4000 may be used as a mobile terminal (MT). The wireless terminal 4000 includes a receiver 2302, a transmitter 2304, a processor 2306, user I/O devices 2307, and a memory 2310 coupled together via a bus 2311 over which the various elements can interchange data and information.

The wireless terminal 4000 includes receiver and transmitter antennas 2303, 2305 which are coupled to receiver and transmitter modules 2302, 2304 respectively. The wireless terminal receiver 2303 receives downlink signals including beacon signals and wideband timing synchronization signals via antenna 2302. In some embodiments a single antenna is used for receiver and transmitter, e.g., in combination with a duplex module. The receiver module 2302 includes a decoder 2333, while the transmitter module 2304 includes an encoder 2335. User I/O devices 2307, e.g., microphone, keypad, keyboard, camera, mouse, switches, speaker, display, etc., allow the user of WT 4000 to input user data, output user data, control applications, and control at least some operations of the wireless terminal, e.g., initiate a communications session.

Memory 2310 includes routines 2321 and data/information 2362. Processor 2306, e.g., a CPU, under control of one or more routines 2321 stored in memory 2310 uses the data/information 2362 to cause the wireless terminal 4000 to operate in accordance with the methods of the present invention. In order to control wireless terminal operation, routines 2321 includes communications routine 2323, and wireless terminal control routines 2325. The communications routine 2323 implements various communications protocols used by the wireless terminal 4000. The wireless terminal control routines 2325 are responsible for insuring that the wireless terminal operates in accordance with the methods of the present invention. Wireless terminal control routines 2325 include a beacon signal detection module 2327, a beacon signal measurement and evaluation module 2329, a wideband synchronization signal evaluation module 2331, a channel estimation module 2354, and a handoff control module 2355. Beacon signal detection module 2327 is used for detecting and identifying beacon signals from a plurality of cells and or sector base station transmitters. Beacon signal measurement and evaluation module 2329 measures the energy level and/or strength of the received beacon signals and evaluates beacon signals with respect to other received beacon signals. Wideband synchronization signal evaluation module 2331 processes received wideband synchronization signals and determines synchronization timing from the signals, e.g., used in establishing communications with a different base station as the mobile node's attachment point. Wideband synchronization signal evaluation module 2331 processes a received wideband synchronization signal to produce a timing adjustment control signal. Channel estimation module 2354 performs a channel estimate based on the received wideband synchronization signal and Null tones included in the wideband signal. Handoff control module 2355 is used for changing attachment points, e.g., from one base station to another base station, and the handoff control module 2355 controls the adjustment of transmitter 2304 timing at the appropriate time in the handoff process using information supplied by the wideband signal evaluation module 2331. In addition, the handoff control module 2355 uses the channel estimate based on the wideband signal 2351 to initialize another channel estimate 2352 that is to be used when attaching to the point from which the wideband signal used to generate the channel estimate was transmitted.

Data/information 2362 includes user/device/session /resource information 2312, e.g., user information, device information, WT 4000 state information, peer node info, addressing information, routing information, session parameters, air link resource information such as information identifying uplink and downlink channel segments assigned to WT 4000. User/device/session/resource information 2312 may be accessed and used to implement the methods of the present invention and/or data structures used to implement the invention. Data/information 2362 also includes system data/information 2333 which includes a plurality of sets of system base station information (BS 1 data/information 2360, ..., BS N data/information 2361). BS 1 data/information 2360 includes beacon information 2335, synchronization signal information 2337, timing information 2339, and frequency information 2341. Data/information 2362 also includes a terminal ID 2343, e.g., a BS assigned identifier, timing information 2345, e.g., pertaining to the current point of attachment and also pertaining to other base stations, base station identification information 2347, e.g., the ID of the current attachment point and the ID of each BS associated with a received beacon signal. Data/information 2362 also includes data 2349, e.g., user data such as voice data, image data, audio data, text data, file data, etc., received from and to be transmitted to a peer node of WT 4000 in a communications session with WT 4000.

Data/information 2362 also includes timing adjustment control signal information 2350, channel estimate based on wideband signal/Null tones 2351, and channel estimate for new attachment point 2352. Timing adjustment control signal information 2350 is an output of the wideband signal evaluation module 2331 and is used as an input by the handoff control module 2355. Channel estimate based on wideband signal/Null tones 2351 is an output of the channel estimation module 2354 and is used an input to the handoff control module 2355, which uses channel estimate 2351 to initialization of another channel estimate, channel estimate for new attachment point 2352.

Figure 11:
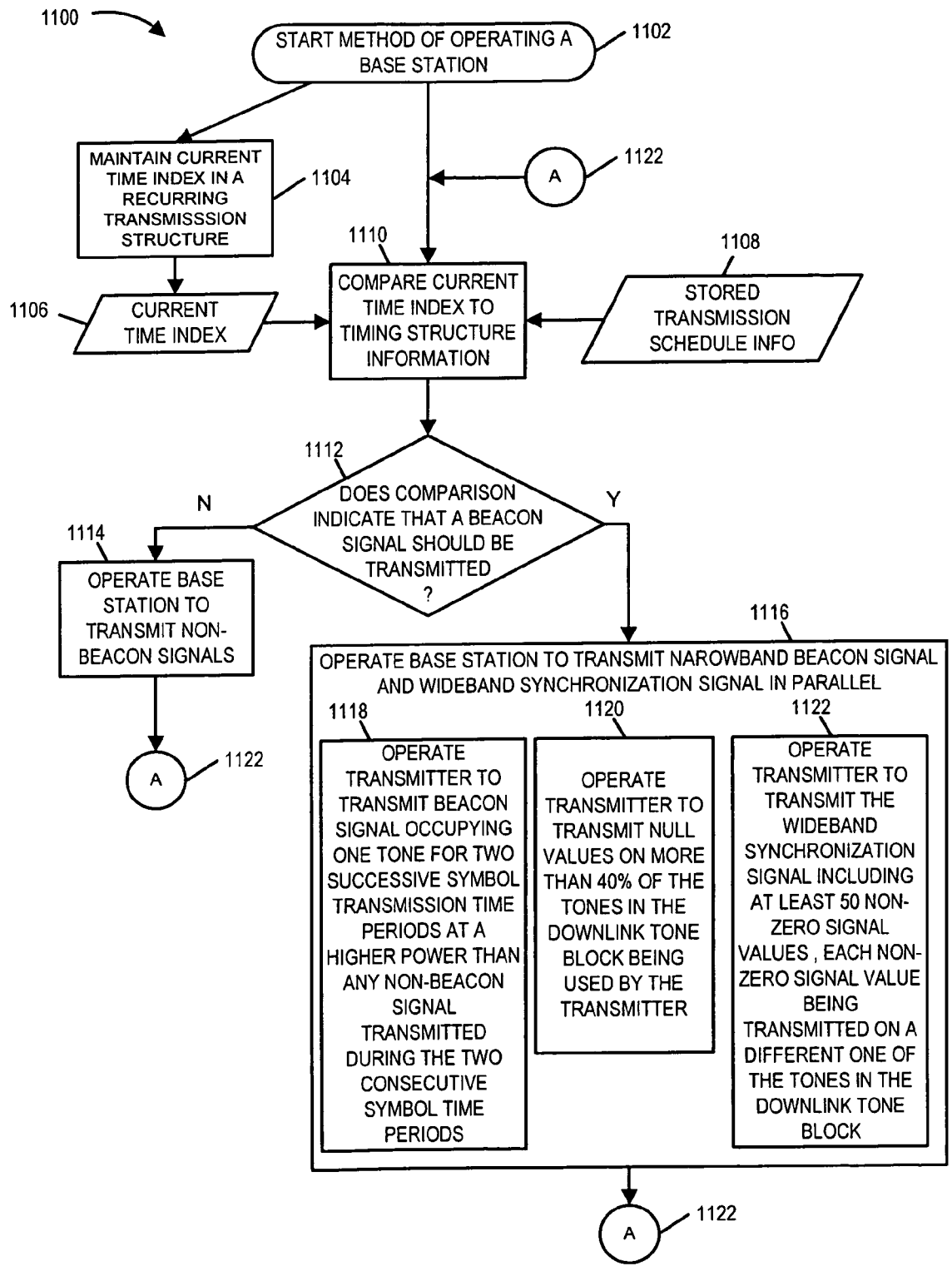
FIG. 11 is a flowchart of an exemplary method of operating a base station in accordance with the present invention.

FIG. 11 is a flowchart 1100 of an exemplary method of operating a base station, e.g., exemplary base station 3000 of FIG. 9, in accordance with the present invention. The exemplary method is started in step 1102, where the base station is powered on and initialized. Operation proceeds from start step 1102 to steps 1104 and step 1110. In step 1104, the base station is operated to maintain current time index in a recurring transmission structure being used by the base station. Current time index 1106 is output from step 1104. Step 1104 is performed on an ongoing basis during base station operation. In step 1110, the base station compares the current time index 1106 to stored transmission schedule information 1108. In step 1112, the base station proceeds based upon the result of the comparison. If the comparison indicates that a beacon signal should be transmitted operation proceeds to step 1116; otherwise operation proceeds to step 1114.

In step 1114, the base station is operated to transmit non-beacon signals, e.g., an OFDM symbol signal that does not include a beacon signal. Operation proceeds from step 1114 via connecting node A 1122 to step 1110.

In step 1116, the base station is operated to transmit a narrowband beacon signal and a wideband synchronization signal in parallel. Step 1116 includes sub-steps 1118, 1120, and 1122 which are performed in parallel. In sub-step 1118, the base station operates its transmitter to transmit the beacon signal occupying one tone for two consecutive symbol transmission time periods at a higher power than any non-beacon signal transmitted during the two consecutive symbol time periods. In some embodiments, the narrowband beacon signal corresponds to less than 2% of the downlink tones used by the transmitter during and between at least one occurrence of the recurring beacon signal transmission time period. In sub-step 1120, the base station operates its transmitter to transmit null values on more than 40% of the tones in the downlink tone block being used by the transmitter. In some embodiment, in sub-step 1120, the base station operates its transmitter to transmit null tones on more than 50% of the total number of downlink tones in a downlink tone block corresponding to the base station transmitter and including the tone on which the single high power beacon tone is transmitted, e.g., 57 Null tones out of a downlink tone block of 113 tones. In sub-step 1122, the base station operates its transmitter to transmit the wideband synchronization signal including at least 50 non-zero signal values, each non-zero signal value being transmitted on a different one of the tones in the downlink tone block. Operation proceeds from step 1116 via connecting node A 1122 to step 1110.

In some embodiments, the recurring transmission schedule is such that the transmitter will transmit signals for at least 50 symbol transmission time periods between each of a recurring beacon signal. In some embodiments, a narrowband beacon signal is transmitted, with a duration of two consecutive OFDM symbol transmission time periods, by a base station sector transmitter corresponding to a downlink tone block once for every beaconslot, e.g., where a beaconslot is 892 successive OFDM symbol transmission time periods in a recurring transmission schedule.

The flowchart 1100 of FIG. 11 describes an exemplary method of operating a base station in accordance with the invention. The method of flowchart 1100 is applicable to various configurations including: a base station transmitter which covers an entire cell acting as an attachment point corresponding to the base station, a base station transmitter which corresponds to a base station sector acting as an attachment point corresponding to the base station sector, a base station cell transmitter associated with a downlink carrier and/or downlink tone block acting as an attachment point corresponding to the cell and tone block/carrier combination, and a base station sector transmitter associated with a downlink carrier and/or downlink tone block acting as an attachment point corresponding to the base station sector and tone block/carrier combination.

An exemplary wireless communications system, in accordance with the present invention may include a plurality of base station transmitters each acting in accordance with the methods of the present invention. For example, a first transmitter in a first cell is operated to transmit on a recurring schedule, for at least two consecutive time periods, a narrowband beacon signal including at least 60% of the power transmitted by the first transmitter during the two consecutive time periods, and a second base station transmitter, located adjacent the first transmitter, is operated to transmit, for at least two consecutive time periods a narrowband beacon signal, said narrowband beacon signal including at least 60% of the power transmitted by said second transmitter during the two consecutive time periods. In some embodiments, the first and second transmitters are located in adjacent cells of a communications system and the first and second transmitters transmit beacon signals during different non-overlapping time periods. In various embodiments, the first transmitter is operated to transmit a wideband signal during at least one of the two consecutive time periods corresponding the beacon signal from the first transmitter. In some such embodiments, the wideband signal has the same duration as the beacon signal. In some embodiments, the wideband signal and the beacon signal occupy two consecutive symbol transmission time periods. In some embodiments, the beacon signal uses a single physical tone which is the same for each of the two consecutive time periods of the beacon signal transmission. In some embodiments, the wideband signal uses a plurality of physical tones, said plurality including the same physical tones during each of said at least two consecutive time periods. In various embodiments, the wideband signal uses at least 30% of the tones used by the first transmitter to transmit symbols in a symbol transmission time period immediately following the said at least two consecutive symbol time periods of the beacon signal transmission. In some embodiments at least 50 tones are used for the wideband signal out of a downlink tone block of 113 tones.

In various embodiments, the beacon signal uses at least 80% of the transmitter power during said at least two consecutive symbol time periods of the beacon transmission interval. In some embodiments, the wideband signal uses 20% or less of the transmitter power during one of said at least two consecutive symbol time periods of the beacon transmission interval. In various embodiments, the wideband signal is at least 5 times wider than the narrowband beacon signal in terms of frequency width. In various embodiments, the wideband signal is at least 10 times wider than the narrowband beacon signal in terms of frequency width. In various embodiments, the wideband signal is at least 20 times wider than the narrowband beacon signal in terms of frequency width.

In some embodiments, the beacon signal is less than 3 tone wide. In some such embodiments, the beacons signal is a single tone wide and the transmitter transmits using a downlink tone block of at least 100 tones, e.g. 113 tones. In some embodiments, the transmitter is an OFDM transmitter and the symbol time is the time used to transmit a single OFDM symbol.

Figure 12:
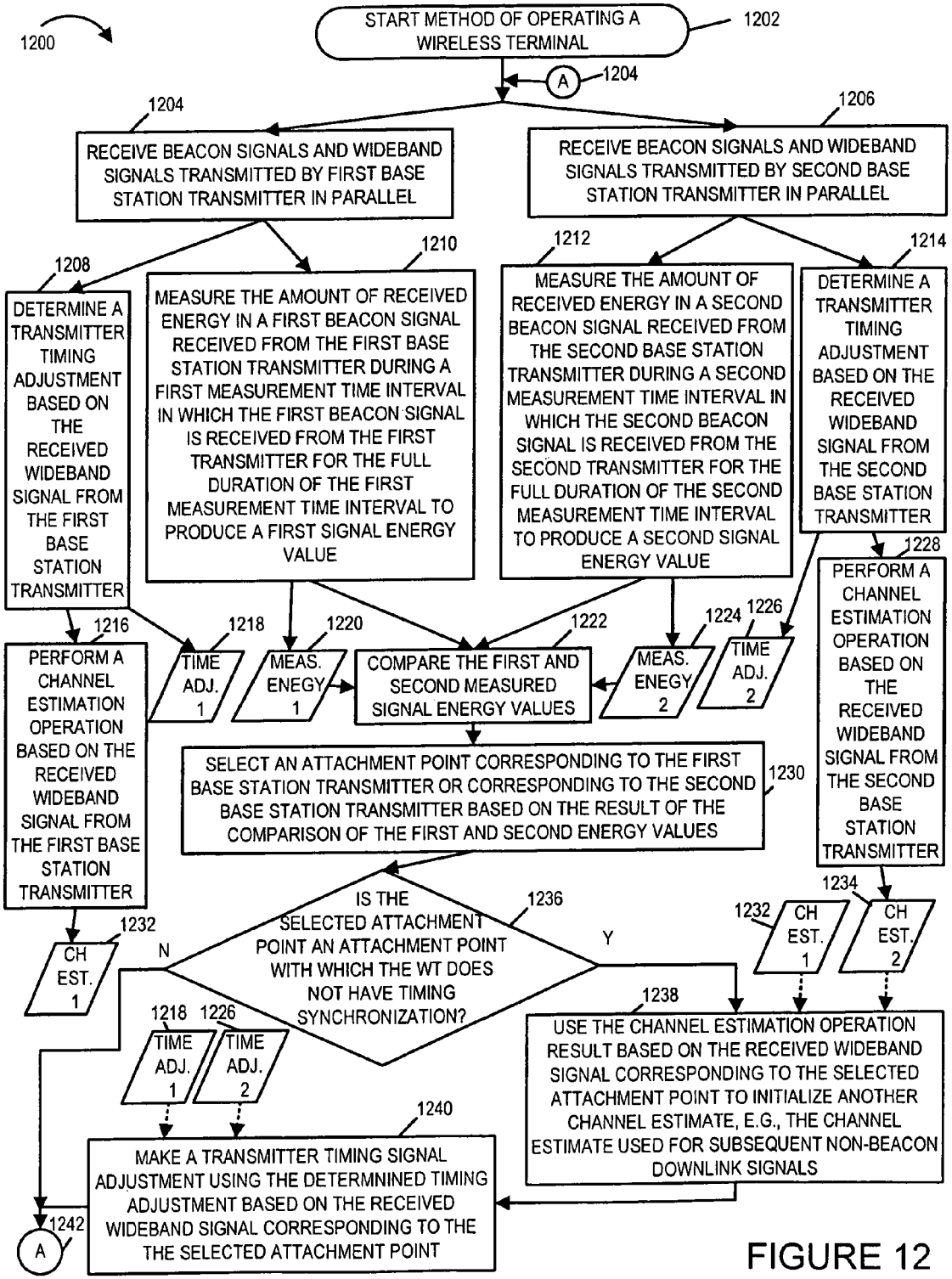
FIG. 12 is a flowchart of an exemplary method of operating a wireless terminal, e.g., mobile node, in accordance with the present invention.

FIG. 12 is a flowchart 1200 of an exemplary method of operating a wireless terminal, e.g., mobile node, in accordance with the present invention. The exemplary wireless terminal is, e.g., wireless terminal 4000 of FIG. 10. The exemplary method starts in step 1202, where the wireless terminal is powered on and initialized. Operation proceeds from start step 1202 to steps 1204 and 1206. In step 1204, the wireless terminal is operated to receive beacon signals, e.g., single tone beacon signals, and wideband signals, e.g., wideband synchronization signals, transmitted by a first base station transmitter in parallel. In step 1206, the wireless terminal is operated to receive beacon signals and wideband signals transmitted by a second base station transmitter in parallel. Operation proceeds from step 1204 to steps 1208 and 1210. Operation proceeds from step 1206 to steps 1212 and 1214.

In step 1210, the wireless terminal measures the amount of received energy in a first beacon signal received from the first base station transmitter during a first measurement time interval in which the first beacon signal is received from the first transmitter for the full duration of the first measurement time interval to produce a first signal energy value, measured energy 1 1220. In step 1212, the wireless terminal measures the amount of received energy in a second beacon signal received from the second base station transmitter during a second measurement time interval in which the second beacon signal is received from the second transmitter for the full duration of the second measurement time interval to produce a second signal energy value, measured energy 2 1224.

In step 1208, the wireless terminal determines a transmitter timing adjustment, timing adjustment 1 1218, based on the received wideband signal from the first base station transmitter. Operation proceeds from step 1208 to step 1216. In step 1216, the wireless terminal performs a channel estimate operation on the received wideband signal from the first base station transmitter, obtaining channel estimate 1 1232.

In step 1214, the wireless terminal determines a transmitter timing adjustment, timing adjustment 2 1226, based on the received wideband signal from the second base station transmitter. Operation proceeds from step 1214 to step 1228. In step 1228, the wireless terminal performs a channel estimate operation on the received wideband signal from the second base station transmitter, obtaining channel estimate 2 1234.

Operation proceeds from steps 1210 and 1212 to step 1222, where the wireless terminal compares the first and second measured signal energy values (1220, 1224). Operation proceeds from step 1222 to step 1230. In step 1230, the wireless terminal selects an attachment point corresponding to the first base station transmitter or the second base station transmitter based on the result of the comparison of the first and second energy values. Operation proceeds from step 1230 to step 1236. In step 1236, the wireless terminal determines if the selected attachment point of step 1230, is an attachment point with which the WT currently has timing synchronization, e.g., closed loop timing synchronization. If the selected attachment point is an attachment point at which the WT does not have timing synchronization, operation proceeds to step 1238; otherwise operation proceeds via connecting node A 1242 to steps 1204 and 1206.

In step 1238, the wireless terminal uses the channel estimation operation result based on the received wideband signal corresponding to the selected attachment point, channel estimate 1 1232 or channel estimate 2 1234, to initialize another channel estimate, e.g., the channel estimate used for subsequent non-beacon downlink signals. Operation proceeds from step 1238 to step 1240. In step 1240, the wireless terminal makes a transmitter timing signal adjustment using the determined timing adjustment based on the received wideband signal corresponding to the selected attachment point, timing adjustment 1 1218 or timing adjustment 2 1226. Operation proceeds from step 1240 via connecting node A 1242 to step 1204 and 1206 to receive additional beacon signals.

In some embodiments, the first and second measurement time intervals are different. In some such embodiments, the first and second measurement time intervals are non-overlapping with each other. In some embodiments, the wideband signal includes multiples tones spaced over a frequency band at least 15 tones wide.

In some embodiments, the steps of determining a transmitter timing adjustment and/or performing a channel estimation operation based on a received wideband signal, are performed for a given attachment point when a selection has been made to use that attachment point and that selected attachment point corresponds to a new attachment point or a handoff; however, the steps of determining a transmitter timing adjustment and/or performing a channel estimation operation based on a received wideband signal are not performed for a given attachment point when a selection has been made not to use that attachment point or when that attachment point is an attachment point currently in use having an ongoing channel estimate and being close loop timing synchronized, e.g., the current in use active link attachment point.

In some embodiments the wireless terminal receives downlink signals in a downlink tone block, e.g., 113 contiguous evenly spaced tones, corresponding to a transmitter. In some such embodiments, the wideband signal includes at least 30% of the tones of the downlink tone block. In some embodiments, the wideband signal includes at least 50 tones communicating a non-zero value. In some embodiments, the beacon tone has been transmitted using at least 60% of power transmitted by the transmitter during an interval in which a beacon is transmitted, while the wideband signal during the same interval has been transmitted using less than or equal to 40% of the power transmitted by the transmitter during the interval in which a beacon is transmitted.

In some embodiments, the first and second base station transmitter correspond to different base stations located at different location. In some embodiment, the first and second base station transmitters correspond to different base station sector transmitters of the same base station. In some embodiments, the first and second base station transmitters correspond to different downlink tone blocks and/or carriers. In some embodiments, the first and second base station transmitters correspond to different tone blocks and/or carriers of the same sector of the same base station.

In some embodiments, the base station transmitters transmit intentional nulls on at least some of tone block tones during the beacon/wideband signaling transmission time periods.

In some embodiments of the invention the beacon signal rides on top of one of the tones used to transmit the wideband signal during the same symbol time as the beacon signal. In such an implementation the wideband signal may occupy the same tone as the beacon signal. In other embodiments the beacon and wideband signal do not use the same tone. The wideband signal need not occupy each tone in the band over which the signal is spread but may be implemented using a plurality of spaced tones. The spacing of the wideband signal tones may be preselected and thus know to wireless terminals.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s)

While described in the context of an OFDM system, at least some of the methods and apparatus of the present invention, are applicable to a wide range of communications systems including many other frequency division multiplexed systems and non-OFDM and/or non-cellular systems. Many of the methods and apparatus of the present invention are also applicable in the context of a multi-sector multi-cell wireless communications system.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method comprising:
    operating a first transmitter in a first cell to transmit on a recurring schedule, for at least two consecutive symbol time periods, a narrowband beacon signal, said narrowband beacon signal including at least 60 percent of the power transmitted by said first transmitter during said two consecutive time periods.

2. The communication method of claim 1, further comprising:
    periodically operating a second transmitter located adjacent said first transmitter, to transmit, for at least two consecutive symbol time periods, a narrowband beacon signal, said narrowband beacon signal including at least 60 percent of the power transmitted by said second transmitter during said two consecutive time periods.

3. The communication method of claim 2, wherein said first and second transmitters are located in adjacent cells of a communications system and wherein said first and second transmitters transmit beacon signals during different non-overlapping symbol time periods.

4. The method of claim 2, wherein said first and second transmitters are transmitters corresponding to different sectors of a base station located in a cell.

5. The method of claim 2, wherein said first and second transmitters are transmitters corresponding to different base stations located in adjacent cells.

6. The method of claim 2, further comprising:
    operating a wireless terminal to receive beacon signals transmitted by said first and second base transmitters and to measure at least one beacon signal received from each of the transmitters to obtain for at least one beacon signal from each of the transmitters the energy received during a symbol time during which the beacon signal is received for the entire symbol time.

7. The method of claim 6, further comprising:
    operating the wireless terminal to compare the energy measured from the received first base station beacon signal during a symbol transmission time period in which the first base station beacon signal was received during the full symbol time in which energy was measured to the energy measured from the received second base station beacon signal during a symbol transmission time period in which the second base station beacon signal was received during the full symbol time in which energy was measured.

8. The method of claim 7, further comprising:
    making a selection of which transmitter the wireless terminal is to interact with based on the measured beacon signal energy.

9. The method of claim 7, further comprising:
    operating the wireless terminal to make a timing signal adjustment based on a wideband signal received during the same symbol time period as a beacon signal.

10. The method of claim 9, wherein said timing signal adjustment is made after the wireless terminal determines that it should interact with a transmitter with which it does not already have timing synchronization, said wideband signal used to make said timing signal adjustment being from the transmitter which said wireless terminal is to interact.

11. The method of claim 9, wherein said wireless terminal uses said wideband signal for channel estimation.

12. The method of claim 11, wherein said wideband signal includes multiple tones spaced over a frequency band at least 15 tones wide.

13. The communications method of claim 1, further comprising:
    operating the first transmitter to transmit a wideband signal during at least one of said at least two consecutive symbol time periods, said wideband signal using less than 40 percent of the power transmitted by said first transmitter during said at least one of said at least two consecutive symbol time periods.

14. The method of claim 13, wherein the wideband signal has the same duration as said beacon signal.

15. The method of claim 14, wherein said beacon signal and said wideband signal occupy two consecutive symbol transmission time periods.

16. The method of claim 15, wherein said beacon signal uses a single physical tone which is the same for each of said at least two consecutive symbol transmission time periods.

17. The method of claim 16, wherein said wideband signal uses a plurality of physical tones, said plurality including the same physical tones during each of said at least two consecutive symbol transmission time periods.

18. The method of claim 16, wherein said wideband signal uses at least 30 percent of the tones used by said first transmitter to transit symbols in a symbol transmission time period immediately following said at least two consecutive symbol transmission time periods.

19. The method of claim 16, wherein at least 50 tones are used out of 113 tones for transmission of said wideband signal.

20. The communications method of claim 13, wherein said beacon signal uses at least 80% of the transmitter power during said at least two consecutive symbol time periods.

21. The communications method of claim 20, wherein said wideband signal uses 20% or less of the transmitter power during one of said at least two consecutive symbol time periods.

22. The communications method of claim 21, wherein said beacon signal is less than 3 tones wide.

23. The communications method of claim 22, wherein said beacon signal is a single tone and wherein said transmitter transmits during each symbol time using at least 100 tones.

24. The communications method of claim 23, wherein said transmitter is an OFDM transmitter and where a symbol time is the time used to transmit a single OFDM symbol.

25. The communications method of claim 20, wherein the wideband signal is at least 5 times wider than the narrowband beacon signal in terms of frequency width.

26. The communications method of claim 20, where the wideband signal is at least 10 times wider than the narrowband beacon signal in terms of frequency width.

27. The communications method of claim 20, where the wideband signal is at least 20 times wider than the narrowband beacon signal in terms of frequency width.

28. A base station comprising:
a first transmitter for transmitting on a plurality of tones;
stored transmission schedule information; and
a first transmitter control module for controlling said first transmitter to transmit on a recurring basis in accordance with said stored schedule information, for at least two consecutive symbol time periods, a narrowband beacon signal, said narrowband beacon signal including at least 60 percent of the power transmitted by said first transmitter during said two consecutive time periods.

29. The base station of claim 28, further comprising:
a second transmitter located adjacent said first transmitter for transmitting on said plurality of tones; and
a second transmitter control module for controlling said second transmitter to transmit, for at least two consecutive symbol time periods, another narrowband beacon signal, said another narrowband beacon signal including at least 60 percent of the power transmitted by said second transmitter during said two consecutive time periods.

30. The base station of claim 28, further comprising:
a wideband signal generating module for generating a wideband signal to be transmitted during at least one of said at least two consecutive symbol time periods, said wideband signal using less than 40 percent of the power transmitted by said first transmitter during said at least one of said at least two consecutive symbol time periods.

31. The base station of claim 30, wherein the wideband beacon signal has the same duration as said beacon signal.

32. The base station of claim 31, wherein said beacon signal and said wideband signal occupy two consecutive symbol transmission time periods.

33. The base station of claim 32, wherein said beacon signal uses a single physical tone which is the same for each of said two consecutive symbol transmission time periods.

34. The base station of claim 33, wherein said wideband signal uses a plurality of physical tones, said plurality including the same physical tones during each of said two consecutive symbol transmission time periods.

35. The base station of claim 33, wherein said wideband signal uses at least 30 percent of the tones used by said first transmitter to transit symbols in a symbol transmission time period immediately following said two consecutive symbol transmission time periods.

36. The base station of claim 33, wherein at least 50 tones are used out of 113 tones for transmission of said wideband signal.

37. The base station of claim 30, wherein said control module includes a transmission power control module for controlling the transmitter to supply at least 80% of the transmitter transmission power used during said two consecutive symbol time periods to said beacon signal.

38. A communications method comprising:
operating a first transmitter in a first cell to transmit, during a first recurring beacon signal transmission time period a narrowband beacon signal, said narrowband beacon signal being transmitted in two consecutive symbol transmission time periods occurring within said first recurring beacon signal transmission time period, said narrowband beacon signal occupying a signal tone transmitted by said transmitter at a higher power level than any non-beacon signal tone transmitted during said at least two consecutive symbol transmission time periods.

39. The method of claim 38, further comprising:
operating the first transmitter to transmit signals for at least 50 symbol transmission time periods between each of said recurring first beacon signal transmission time periods without transmitting any signals with a per tone energy equal to or exceeding said at least one signal tone transmitted at said higher power level.

40. The method of claim 39, wherein said narrowband beacon signal includes a single signal tone having said higher power level, the frequency of said tone being the same for the two consecutive symbol transmission time periods.

41. The method of claim 40, wherein said narrowband beacon signal corresponds to less than 2 percent of the downlink tones used by said first transmitter during and between at least one occurrence of said first recurring beacon signal transmission time period.

42. The method of claim 40, further comprising operating said first transmitter to transmit null values on more than 40 percent of the total number of downlink tones in a downlink tone block corresponding to said first transmitter and including the tone on which said single high power tone is transmitted.

43. The method of claim 40, further comprising operating said first transmitter to transmit null values on more than 50 percent of the total number of downlink tones in a downlink tone block corresponding to said first transmitter and including the tone on which said single high power tone is transmitted.

44. The method of claim 43, wherein the number of tones in said downlink tone block includes 113 tones.

45. The method of claim 43, further comprising operating said first transmitter to transmit a wideband synchronization signal during said consecutive symbol transmission time periods.

46. The method of claim 45, wherein said wideband synchronization signal includes at least 50 non-zero signal values, each non-zero signal value being transmitted on a different one tone in said downlink tone block.

47. A base station comprising:
first transmitter means for transmitting on a plurality of tones;
means for storing transmission schedule information; and
first transmitter control means for controlling said first transmitter means, to transmit on a recurring basis in accordance with said stored schedule information, for at least two consecutive symbol time periods, a narrowband beacon signal, said narrowband beacon signal including at least 60 percent of the power transmitted by said first transmitter means during said two consecutive time periods.

48. The base station of claim 47, further comprising:
second transmitter means for transmitting on said plurality of tones, said second transmitter means for transmitting on said plurality of tones being located adjacent said first transmitter means; and second transmitter control means for controlling said second transmitter means to transmit, for at least two consecutive symbol time periods, another narrowband beacon signal, said another narrowband beacon signal including at least 60 percent of the power transmitted by said second transmitter means for transmitting during said two consecutive time periods.

49. The base station of claim 47, further comprising:
wideband signal generation means for generating a wideband signal to be transmitted during at least one of said at least two consecutive symbol time periods, said wideband signal using less than 40 percent of the power transmitted by said first transmitter means for transmitting, during said at least one of said at least two consecutive symbol time periods.

50. A non-transitory machine readable medium including machine executable instructions for controlling a base station, the computer readable medium comprising:
instructions for controlling a first transmitter to transmit on a plurality of tones;
instructions for controlling said base station to store transmission schedule information; and
instructions for controlling said first transmitter to transmit on a recurring basis in accordance with said stored schedule information, for at least two consecutive symbol time periods, a narrowband beacon signal, said narrowband beacon signal including at least 60 percent of the power transmitted by said first transmitter during said two consecutive time periods.

51. A communications device comprising:
a first transmitter in a cell to transmit signals; and
a transmitter control module for controlling said first transmitter to transmit, during a first recurring beacon signal transmission time period, a narrowband beacon signal, said narrowband beacon signal being transmitted in two consecutive symbol transmission time periods occurring within said first recurring beacon signal transmission time period, said narrowband beacon signal occupying a signal tone transmitted by said transmitter at a higher power level than any non-beacon signal tone transmitted during said at least two consecutive symbol transmission time periods.

52. The communications device of claim 51,
wherein said transmitter control module is configured to control the first transmitter to transmit signals for at least 50 symbol transmission time periods between each of said recurring first beacon signal transmission time periods without transmitting any signals with a per tone energy equal to or exceeding said at least one signal tone transmitted at said higher power level.

53. The communications device of claim 52, wherein said narrowband beacon signal includes a single signal tone having said higher power level, the frequency of said tone being the same for the two consecutive symbol transmission time periods.

54. A communications device comprising:
transmitter means for transmitting signals; and
transmitter control means for controlling said transmitter means to transmit, during a first recurring beacon signal transmission time period, a narrowband beacon signal, said narrowband beacon signal being transmitted in two consecutive symbol transmission time periods occurring within said first recurring beacon signal transmission time period, said narrowband beacon signal occupying a signal tone transmitted by said transmitter means at a higher power level than any non-beacon signal tone transmitted during said at least two consecutive symbol transmission time periods.

55. The communications device of claim 54, wherein said transmitter control means include means for controlling the transmitter means to transmit signals for at least 50 symbol transmission time periods between each of said recurring first beacon signal transmission time periods without transmitting any signals with a per tone energy equal to or exceeding said at least one signal tone transmitted at said higher power level.

56. The communications device of claim 55, wherein said narrowband beacon signal includes a single signal tone having said higher power level, the frequency of said tone being the same for the two consecutive symbol transmission time periods.

57. A non-transitory machine readable medium including machine executable instructions for controlling a communications device, the computer readable medium comprising:
instructions for controlling a transmitter to transmit, during a first recurring beacon signal transmission time period, a narrowband beacon signal, said narrowband beacon signal being transmitted in two consecutive symbol transmission time periods occurring within said first recurring beacon signal transmission time period, said narrowband beacon signal occupying a signal tone transmitted by said transmitter means at a higher power level than any non-beacon signal tone transmitted during said at least two consecutive symbol transmission time periods.

* * * * *